(12) United States Patent
Hosotani

(10) Patent No.: US 10,910,880 B2
(45) Date of Patent: Feb. 2, 2021

(54) POWER TRANSMISSION DEVICE, POWER RECEPTION DEVICE, AND WIRELESS POWER SUPPLY SYSTEM

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 40 days.

(21) Appl. No.: 16/039,002

(22) Filed: Jul. 18, 2018

(65) Prior Publication Data

US 2018/0323655 A1 Nov. 8, 2018

Related U.S. Application Data

(63) Continuation of application No. PCT/JP2017/007603, filed on Feb. 28, 2017.

(30) Foreign Application Priority Data

Mar. 18, 2016 (JP) .................................. 2016-056202

(51) Int. Cl.
*H01F 27/42* (2006.01)
*H01F 37/00* (2006.01)
(Continued)

(52) U.S. Cl.
CPC .............. *H02J 50/12* (2016.02); *H01F 27/28* (2013.01); *H01F 38/14* (2013.01); *H02J 7/025* (2013.01); *H02J 50/50* (2016.02); *H02J 50/70* (2016.02)

(58) Field of Classification Search
CPC .. H02J 50/12; H02J 50/70; H02J 7/025; H02J 50/10; H02J 50/50; H01F 38/14; H01F 27/28; B60L 53/12
See application file for complete search history.

(56) References Cited

U.S. PATENT DOCUMENTS

2011/0133569 A1\* 6/2011 Cheon ..................... H02J 50/90
307/104
2011/0175455 A1\* 7/2011 Hashiguchi ............. H02J 5/005
307/104
(Continued)

FOREIGN PATENT DOCUMENTS

JP 2012-175896 A 9/2012
JP 2012-248747 A 12/2012
(Continued)

OTHER PUBLICATIONS

International Search Report issued in PCT/JP2017/007603; dated May 23, 2017.
(Continued)

*Primary Examiner* — Daniel J Cavallari
*Assistant Examiner* — Rasem Mourad
(74) *Attorney, Agent, or Firm* — Studebaker & Brackett PC

(57) ABSTRACT

A power transmission circuit is connected to a power transmission coil having a coil aperture. The power transmission circuit includes a conductive or magnetic power-transmission-coil near member opposed to the coil aperture of the power transmission coil, and a repeating coil arranged on a side opposite to a side on which the power-transmission-coil near member is arranged with respect to the power transmission coil and coupled to the power transmission coil at least via a magnetic field. When a shortest distance between the power transmission coil and the power-transmission-coil near member is expressed as (dt1) and a shortest distance between the power transmission coil and the repeating coil is expressed as (dt2), dt2≤dt1.

9 Claims, 6 Drawing Sheets

(51) Int. Cl.
- *H01F 38/00* (2006.01)
- *H02J 50/12* (2016.01)
- *H01F 38/14* (2006.01)
- *H02J 50/70* (2016.01)
- *H02J 50/50* (2016.01)
- *H01F 27/28* (2006.01)
- *H02J 7/02* (2016.01)

(56) References Cited

U.S. PATENT DOCUMENTS

| | | | |
|---|---|---|---|
| 2012/0119708 A1* | 5/2012 | Toya | H02J 7/025 320/137 |
| 2012/0223594 A1 | 9/2012 | Gotani | |
| 2012/0242447 A1* | 9/2012 | Ichikawa | B60L 11/182 336/84 C |
| 2012/0306262 A1* | 12/2012 | Taguchi | B60L 3/00 307/9.1 |
| 2013/0015699 A1* | 1/2013 | Mita | H02J 5/005 307/9.1 |
| 2013/0037365 A1* | 2/2013 | Ichikawa | B60L 53/39 191/10 |
| 2014/0042822 A1* | 2/2014 | Nakahara | H02J 5/005 307/104 |
| 2014/0159502 A1 | 6/2014 | Shimokawa et al. | |
| 2015/0008877 A1* | 1/2015 | Ichikawa | H01F 27/362 320/108 |
| 2016/0355094 A1* | 12/2016 | Yamakawa | B60L 58/21 |

FOREIGN PATENT DOCUMENTS

| | | |
|---|---|---|
| JP | 2014-060888 A | 4/2014 |
| JP | 2014-143836 A | 8/2014 |
| JP | 2014-183672 A | 9/2014 |
| JP | 2015-084641 A | 4/2015 |
| WO | 2012118112 A1 | 9/2012 |
| WO | 2013031988 A1 | 3/2013 |
| WO | 2014/057959 A1 | 4/2014 |
| WO | 2015/125276 A1 | 8/2015 |

OTHER PUBLICATIONS

International Preliminary Report on Patentability and Written Opinion issued in PCT/JP2017/007603; dated Sep. 18, 2018.

An Office Action; "Notification of Reasons for Refusal," Mailed by the Japanese Patent Office dated Jul. 30, 2019, which corresponds to Japanese Patent Application No. 2018-505779 and is related to U.S. Appl. No. 16/039,002; with English language translation.

* cited by examiner

POWER TRANSMISSION DEVICE, POWER RECEPTION DEVICE, AND WIRELESS POWER SUPPLY SYSTEM

CROSS-REFERENCE TO RELATED APPLICATIONS

This application claims benefit of priority to International Patent Application No. PCT/JP2017/007603, filed Feb. 28, 2017, and to Japanese Patent Application No. 2016-056202, filed Mar. 18, 2016, the entire contents of each are incorporated herein by reference.

BACKGROUND

Technical Field

The present disclosure relates to a power transmission device and reception device for electric power and a wireless power supply system including them.

Background Art

In wireless power supply systems of the magnetic-field coupling type, including the electromagnetic induction type, magnetic-field resonance type, and direct-current resonance type, power is supplied by coupling between a power transmission coil in a power transmission device and a power reception coil in a power reception device via a magnetic field. One example power supply system of the direct-current resonance type is illustrated in International Publication No. 2014-057959.

SUMMARY

The above-described power transmission device and power reception device are configured such that when they are arranged in a predetermined positional relation, the power transmission coil included in the power transmission device and the power reception coil included in the power reception device are magnetic-field coupled to each other.

A conductive member or magnetic member made of aluminum, iron, or the like may be disposed in the vicinity of or inside the power transmission device. Depending on the usage, such a conductive member or magnetic member may be nearer to the power transmission coil than to the power reception coil. In that state, the above-described conductive member or magnetic member deprives magnetic-field energy from magnetic flux generated by the power transmission coil, it is converted into Joule heat or the like, and this results in an energy loss and a decrease in the efficiency of supplying power, and may cause a failure of wireless power supply.

Accordingly, the present disclosure provides a power transmission device, a power reception device, and a wireless power supply system including them in which an increase in power loss or a decrease in power efficiency in the system caused by an energy loss resulting from an eddy current or the like occurring in a conductive member or magnetic member having a two-dimensional portion caused by approach of the conductive member or magnetic member to a power transmission coil or a power reception coil is suppressed.

(1) The present disclosure provides a power transmission device in a wireless power supply system in which high-frequency power is wirelessly provided from the power transmission device to a power reception device. The power transmission device includes a power transmission coil, and the power reception device includes a power reception coil at least magnetic-field coupled to the power transmission coil. Also, the power transmission coil has a coil aperture. The power transmission device further includes a power transmission circuit connected to the power transmission coil, a conductive or magnetic power-transmission-coil near member opposed to the coil aperture of the power transmission coil and having a planar or curved surface portion, an eddy current caused by a magnetic field based on an operation of the wireless power supply system being allowed to flow in the power-transmission-coil near member, and a repeating coil arranged on a side opposite to a side on which the power-transmission-coil near member is arranged with respect to the power transmission coil and coupled to the power transmission coil at least via a magnetic field. When a shortest distance between the power transmission coil and the power-transmission-coil near member is expressed as dt1 and a shortest distance between the power transmission coil and the repeating coil is expressed as dt2, dt2≤dt1.

In the above-described configuration, of the magnetic flux produced from the power transmission coil, magnetic flux that does not reach the power-transmission-coil near member can link with the repeating coil. Accordingly, the effect of the power-transmission-coil near member is small, and power can be supplied from the power transmission coil to the power reception coil via the repeating coil.

(2) The present disclosure further provides a power transmission device in which high-frequency power is wirelessly provided from the power transmission device to a power reception device. The power transmission device includes a power transmission coil. The power reception device includes a power reception coil at least magnetic-field coupled to the power transmission coil. Also, the power transmission coil has a coil aperture. The power transmission device further includes a power transmission circuit connected to the power transmission coil, a casing housing the power transmission coil and having an inner surface opposed to the coil aperture of the power transmission coil and an outer surface on a back side of the inner surface, and a repeating coil arranged on a side opposite to the inner surface of the casing with respect to the power transmission coil and coupled to the power transmission coil at least via a magnetic field. When a shortest distance between the power transmission coil and the outer surface of the casing is expressed as dt1' and a shortest distance between the power transmission coil and the repeating coil is expressed as dt2, dt2≤dt1'.

In the above-described configurations, if the power transmission device is placed on a metal plate, for example, because, of the magnetic flux generated by the power transmission coil, magnetic flux that does not reach the metal plate links with the repeating coil, the effect of the metal plate is small, and power can be supplied from the power transmission coil to the power reception coil via the repeating coil.

(3) Also, in both of the above-described configurations (1) or (2) of the power transmission device, the power transmission device may preferably further include a capacitor connected to the repeating coil and constituting a resonance circuit together with the repeating coil.

(4) A resonance frequency of the resonance circuit may preferably be equal to a frequency of an alternating magnetic field formed from the power transmission coil. Thus, a current flowing in the repeating coil at the resonance frequency increases, and the power efficiency is enhanced.

(5) The present disclosure also provides a power reception device in a wireless power supply system in which high-frequency power is wirelessly provided from a power transmission device to the power reception device. The power transmission device includes a power transmission coil. The power reception device includes a power reception coil at least magnetic-field coupled to the power transmission coil. Also, the power reception coil has a coil aperture. The power reception device further includes a power reception circuit connected to the power reception coil, a conductive or magnetic power-reception-coil near member opposed to the coil aperture of the power reception coil and having a planar or curved surface portion, an eddy current caused by a magnetic field based on an operation of the wireless power supply system being allowed to flow in the power-reception-coil near member, and a repeating coil arranged on a side opposite to a side on which the power-reception-coil near member is arranged with respect to the power reception coil and coupled to the power reception coil at least via a magnetic field. When a shortest distance between the power reception coil and the power-reception-coil near member is expressed as dr1 and a shortest distance between the power reception coil and the repeating coil is expressed as dr2, dr2≤dr1.

In the above-described configuration, of the magnetic flux linking with the power reception coil, magnetic flux that does not reach the power-reception-coil near member can link with the repeating coil. Accordingly, the effect of the power-reception-coil near member is small, and power can be supplied from the power transmission coil to the power reception coil via the repeating coil.

(6) The present disclosure further provides a power reception device in a wireless power supply system in which high-frequency power is wirelessly provided from a power transmission device to the power reception device. The power transmission device includes a power transmission coil. The power reception coil includes a power reception coil at least magnetic-field coupled to the power transmission coil. Also, the power reception coil has a coil aperture. The power reception device further includes a power reception circuit connected to the power reception coil, a casing housing the power reception coil and having an inner surface opposed to the coil aperture of the power reception coil and an outer surface on a back side of the inner surface, and a repeating coil arranged on a side opposite to the inner surface of the casing with respect to the power reception coil and coupled to the power reception coil at least via a magnetic field. When a distance between the power reception coil and the outer surface of the casing is expressed as dr1' and a distance between the power reception coil and the repeating coil is expressed as dr2, dr2≤dr1'.

In the above-described configuration, if a metal plate is arranged near the power reception device, for example, because magnetic flux links with the repeating coil in the state where that magnetic flux does not reach the metal plate, the effect of the metal plate is small, and power can be supplied from the power transmission coil to the power reception coil via the repeating coil.

(7) Also, in both of the above-described configurations (5) or (6) of the power reception device, the power reception device may preferably further include a resonance capacitor connected to the repeating coil and constituting a resonance circuit together with the repeating coil.

(8) In addition, a resonance frequency of the resonance circuit may preferably be equal to a frequency of an alternating magnetic field formed from the power transmission coil. Thus, a resonance current flowing in the repeating coil at the resonance frequency increases, and the power efficiency is enhanced.

(9) Furthermore, a wireless power supply system according to the present disclosure is the one in which high-frequency power is wirelessly provided from a power transmission device to a power reception device. The power transmission device includes a power transmission coil. The power reception device includes a power reception coil at least magnetic-field coupled to the power transmission coil. Also, the power transmission coil has a coil aperture. The power transmission device further includes a power transmission circuit connected to the power transmission coil, a conductive or magnetic power-transmission-coil near member opposed to the coil aperture of the power transmission coil and having a planar or curved surface portion, an eddy current caused by a magnetic field based on an operation of the wireless power supply system being allowed to flow in the power-transmission-coil near member, and a repeating coil arranged on a side opposite to a side on which the power-transmission-coil near member is arranged with respect to the power transmission coil and coupled to the power transmission coil at least via a magnetic field. When a distance between the power transmission coil and the power-transmission-coil near member is expressed as dt1 and a distance between the power transmission coil and the repeating coil is expressed as dt2, dt2≤dt1.

In the above-described configuration, of the magnetic flux generated by the power transmission coil, magnetic flux that does not reach the power-transmission-coil near member can link with the repeating coil. Accordingly, the effect of the power-transmission-coil near member is small, and power can be supplied from the power transmission coil to the power reception coil via the repeating coil.

(10) In addition, a wireless power supply system according to the present disclosure is the one in which high-frequency power is wirelessly provided from a power transmission device to a power reception device. The power transmission device includes a power transmission coil. The power reception device includes a power reception coil at least magnetic-field coupled to the power transmission coil. Also, the power transmission coil has a coil aperture.

The power transmission device includes a power transmission circuit connected to the power transmission coil, a casing housing the power transmission coil and having an inner surface opposed to the coil aperture of the power transmission coil and an outer surface on a back side of the inner surface, and a repeating coil arranged on a side opposite to the inner surface of the casing with respect to the power transmission coil and coupled to the power transmission coil at least via a magnetic field. When a distance between the power transmission coil and the outer surface of the casing is expressed as dt1' and a distance between the power transmission coil and the repeating coil is expressed as dt2, dt2≤dt1'.

In the above-described configuration, if the power transmission device is placed on a metal plate, for example, because, of the magnetic flux generated by the power transmission coil, magnetic flux that does not reach the metal plate links with the repeating coil, the effect of the metal plate is small, and power can be supplied from the power transmission coil to the power reception coil via the repeating coil.

(11) Also, in both of the above-described wireless power supply systems (9) or (10), where an ordinal number is expressed as n-th (n is an integer greater than or equal to one), when the repeating coil includes an n-th repeating coil and an (n+1)-th repeating coil positioned farther from the power transmission coil than the n-th repeating coil, and a distance from the n-th repeating coil to the (n+1)-th repeating coil is expressed as dt(n+2) and a distance from an (n−1)-th repeating coil positioned nearer the power transmission coil than the n-th repeating coil to the n-th repeating coil or a distance from the power transmission coil to the n-th repeating coil is expressed as dt(n+1), dt(n+2)≤dt(n+1). Thus, power can be efficiently supplied via the plurality of repeating coils.

(12) Furthermore, a wireless power supply system according to the present disclosure is the one in which high-frequency power is wirelessly provided from a power transmission device to a power reception device. The power transmission device includes a power transmission coil. The power reception device including a power reception coil at least magnetic-field coupled to the power transmission coil. Also, the power reception coil has a coil aperture. The power reception device includes a power reception circuit connected to the power transmission coil, a conductive or magnetic power-reception-coil near member opposed to the coil aperture of the power reception coil and having a planar or curved surface portion, an eddy current caused by a magnetic field based on an operation of the wireless power supply system being allowed to flow in the power-reception-coil near member, and a repeating coil arranged on a side opposite to a side on which the power-reception-coil near member is arranged with respect to the power reception coil and coupled to the power reception coil at least via a magnetic field. When a distance between the power reception coil and the power-reception-coil near member is expressed as dr1 and a distance between the power reception coil and the repeating coil is expressed as dr2, dr2≤dr1.

In the above-described configuration, of the magnetic flux linking with the power reception coil, magnetic flux that does not reach the power-reception-coil near member links with the repeating coil. Accordingly, the effect of the power-reception-coil near member is small, and power can be supplied from the power transmission coil to the power reception coil via the repeating coil.

(13) In addition, a wireless power supply system according to the present disclosure is the one in which high-frequency power is wirelessly provided from a power transmission device to a power reception device. The power transmission device includes a power transmission coil. The power reception device includes a power reception coil at least magnetic-field coupled to the power transmission coil. Also, the power reception coil has a coil aperture. The power reception device includes a power reception circuit connected to the power transmission coil, a casing housing the power reception coil and having an inner surface opposed to the coil aperture of the power reception coil and an outer surface on a back side of the inner surface, and a repeating coil arranged on a side opposite to the inner surface of the casing with respect to the power reception coil and coupled to the power reception coil at least via a magnetic field. When a distance between the power reception coil and the outer surface of the casing is expressed as dr1' and a distance between the power reception coil and the repeating coil is expressed as dr2, dr2≤dr1'.

In the above-described configuration, if a metal plate is arranged near the power reception device, for example, because magnetic flux links with the repeating coil in the state where that magnetic flux does not reach the metal plate, the effect of the metal plate is small, and power can be supplied from the power transmission coil to the power reception coil via the repeating coil.

(14) In any of the configurations (8) to (13) described above, the wireless power supply system may preferably further include a resonance capacitor connected to the repeating coil and constituting a resonance circuit together with the repeating coil.

(15) A resonance frequency of the resonance circuit may preferably be equal to a frequency of an alternating magnetic field formed from the power transmission coil. Thus, a current flowing in the repeating coil at the resonance frequency increases, and the power efficiency is enhanced.

According to the present disclosure, a power transmission device, a power reception device, and a wireless power supply system including them in which an increase in power loss or a decrease in power efficiency in the system caused by an energy loss resulting from an eddy current or the like occurring in a conductive member or magnetic member having a two-dimensional portion caused by approach of the conductive member or magnetic member to a power transmission coil or a power reception coil is suppressed are obtainable.

DETAILED DESCRIPTION

Figure 1:
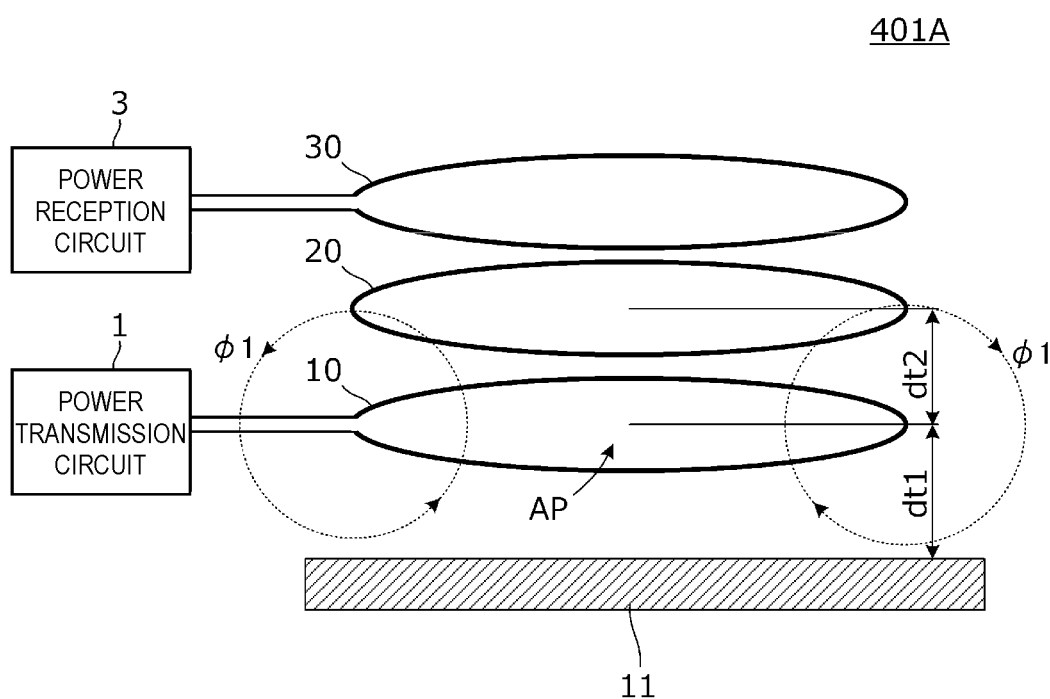
FIG. 1 illustrates a configuration of a power transmission device and a wireless power supply system 401A according to a first embodiment.

A plurality of embodiments for carrying out the present disclosure are described below by using several specific examples with reference to drawings. The same reference numerals are used in the same areas in the drawings. In consideration of the explanation of main points or the facilitation of understanding, the embodiments are separately illustrated for the sake of convenience. The configurations illustrated in different embodiments may be replaced or combined in part. The description of items in the second and subsequent embodiments common to the first embodiment is omitted, and only different points are described. In particular, substantially the same operational advantages obtained from substantially the same configurations are not described in detail in each embodiment.

First Embodiment

FIG. 1 illustrates a configuration of a power transmission device and a wireless power supply system 401A according to a first embodiment. The wireless power supply system 401A is a wireless power supply system in which high-frequency power is provided by at least the magnetic-field resonance manner from a power transmission device including a power transmission coil 10 to a power reception device including a power reception coil 30 at least magnetic-field coupled to the power transmission coil 10.

As illustrated in FIG. 1, the wireless power supply system 401A includes the power transmission coil 10, a repeating coil 20, and the power reception coil 30, each of which has a circular loop shape. The repeating coil 20 is disposed between the power transmission coil 10 and power reception coil 30. The coil apertures of the power transmission coil 10, repeating coil 20, and power reception coil 30 are opposed to each other. That is, the winding axes of the power transmission coil 10, repeating coil 20, and power reception coil 30 coincide with or are parallel with each other.

The power transmission coil 10 is connected to a power transmission circuit 1. The power reception coil 30 is connected to a power reception circuit 3. The power transmission coil 10 and repeating coil 20 are at least magnetic-field coupled to each other. The repeating coil 20 and power reception coil 30 are at least magnetic-field coupled to each other. Accordingly, the power transmission coil 10 and power reception coil 30 are at least magnetic-field coupled to each other via the repeating coil 20.

The power transmission coil 10 has a coil aperture AP. The coil aperture AP of the power transmission coil 10 is opposed to a power-transmission-coil near member 11. The power-transmission-coil near member 11 is a conductive or magnetic member. Examples of the power-transmission-coil near member 11 may include an iron plate, a stainless steel plate, and an aluminum plate. The power-transmission-coil near member 11 is positioned inside or outside a casing of the power transmission device, as described below. When the power-transmission-coil near member 11 is positioned inside the casing, it may be a shield plate, a battery pack, a ground conductor pattern on a circuit board, or the like. When the power-transmission-coil near member 11 is outside the casing, it may be a steel desk, a portion of a human body, such as a palm, or the like.

The repeating coil 20 is arranged on the side opposite to the side on which the power-transmission-coil near member 11 is arranged with respect to the power transmission coil 10. When the shortest distance between the power transmission coil 10 and power-transmission-coil near member 11 is expressed as dt1 and the shortest distance between the power transmission coil 10 and repeating coil 20 is expressed as dt2, dt2≤dt1. The "shortest distance" described above indicates the shortest distance among distances between infinitesimal sections when the two coils are in the infinitesimal sections.

In FIG. 1, magnetic flux φ1 represents a path of magnetic flux generated by the power transmission coil 10. In the above-described configuration, of the magnetic flux generated by the power transmission coil 10, magnetic flux φ1 that does not reach the power-transmission-coil near member 11 links with the repeating coil 20. If dt2>dt1, magnetic flux that aims to link with the repeating coil 20 of the magnetic flux generated by the power transmission coil 10 would reach the power-transmission-coil near member 11. When the power-transmission-coil near member 11 exhibits conductivity, if dt2>dt1, an eddy current would flow in the power-transmission-coil near member 11, an energy loss would occur in the power-transmission-coil near member 11, and the efficiency of supplying power from the power transmission coil 10 to the repeating coil 20 would significantly decrease. When the power-transmission-coil near member 11 exhibits magnetic properties, if dt2>dt1, a hysteresis loss would occur in the power-transmission-coil near member 11, and the efficiency of supplying power from the power transmission coil 10 to the repeating coil 20 would significantly decrease. When the power-transmission-coil near member 11 exhibits both of the conductivity and magnetic properties, both the above-described eddy current loss and hysteresis loss occur.

When dt2≤dt1, as in the present embodiment described above, the effect of the above-described power-transmission-coil near member 11 is small, and the repeating coil 20 is coupled to the power transmission coil 10. Accordingly, power can be supplied from the power transmission coil 10 to the power reception coil 30 via the repeating coil 20 with high efficiency.

Figure 2:
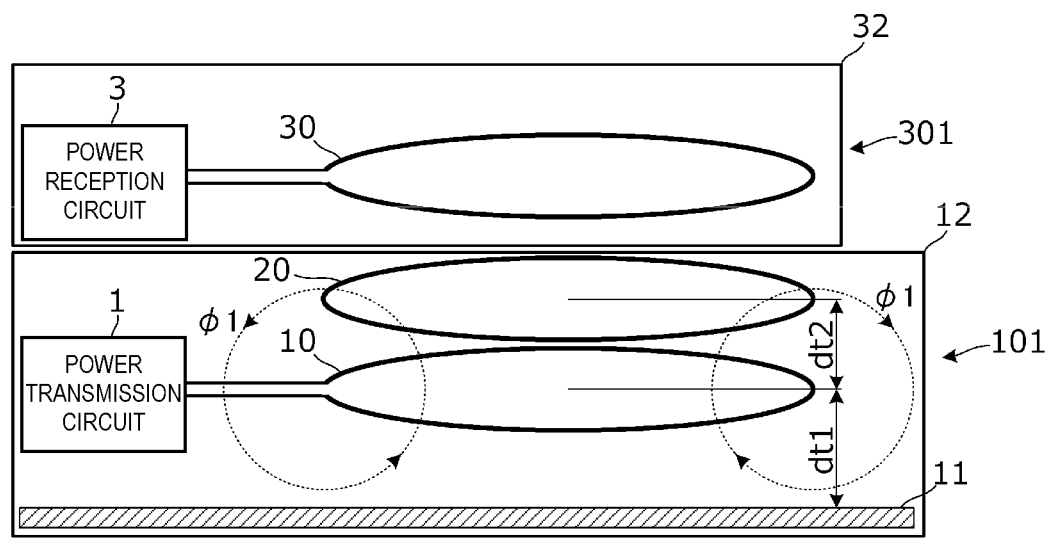
FIG. 2 illustrates a configuration of another wireless power supply system 401B according to the present embodiment.

FIG. 2 illustrates a configuration of another wireless power supply system 401B according to the present embodiment. The wireless power supply system 401B includes a power transmission device 101 and a power reception device 301.

The power transmission device 101 includes a nonmagnetic and insulating casing 12. The casing 12 houses the power transmission circuit 1, power transmission coil 10, repeating coil 20, and power-transmission-coil near member 11. Examples of the power-transmission-coil near member 11 may include a shield plate, a battery pack, a ground conductor pattern on a circuit board, or the like.

The power reception device 301 includes a nonmagnetic and insulating casing 32. The casing 32 houses the power reception circuit 3 and power reception coil 30. FIG. 2 illustrates a state in which the power reception device 301 is placed on a placement surface of the power transmission device 101.

When the shortest distance between the power transmission coil 10 and power-transmission-coil near member 11 is expressed as dt1 and the shortest distance between the power transmission coil 10 and repeating coil 20 is expressed as dt2, dt2≤dt1. Even when the power-transmission-coil near member 11 is included in the power transmission device, as in this example, by the virtue of the relation dt2≤dt1, the effect of the above-described power-transmission-coil near member 11 is small, and the repeating coil 20 is coupled to the power transmission coil 10. Accordingly, power can be supplied from the power transmission coil 10 to the power reception coil 30 via the repeating coil 20 with high efficiency.

Because the above-described power-transmission-coil near member 11 is arranged on the lower surface of the power transmission device 101, it functions as a shield plate. That is, when the power transmission device 101 is placed on a steel desk, for example, the power transmission coil 10 is not substantially affected by the steel desk, which is positioned below the power-transmission-coil near member 11, and stable characteristics are obtainable. The power-transmission-coil near member 11 may be an integral part of the casing 12.

Figure 3:
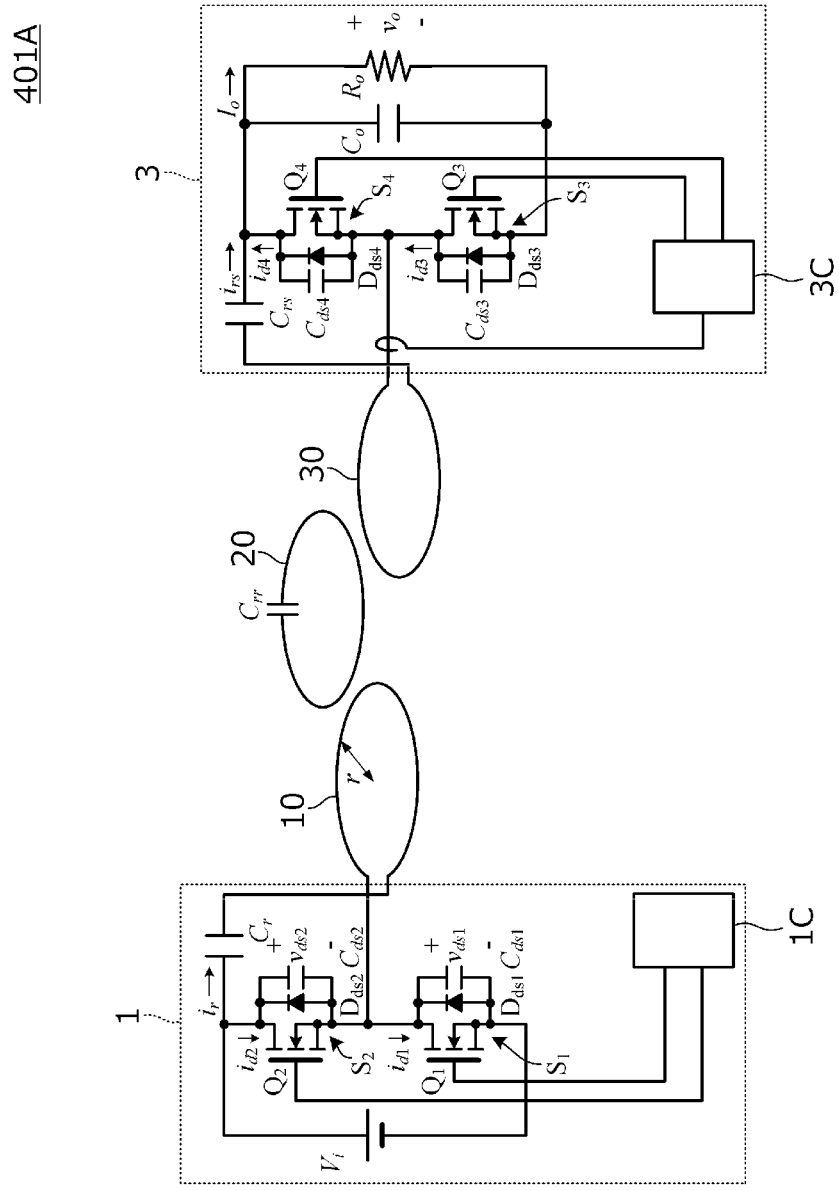
FIG. 3 is a circuit diagram of the wireless power supply system 401A according to the first embodiment.

FIG. 3 is a circuit diagram of the wireless power supply system 401A according to the first embodiment.

The wireless power supply system 401A is a system that includes an input power source Vi in an input portion of the power transmission circuit 1 and that wirelessly provides a load Ro in the power reception circuit 3 with stable direct-current energy. The power transmission circuit 1 includes a resonance capacitor Cr, switch elements Q1 and Q2, and a transmission-side switching circuit including a switching control circuit 1C configured to control these switch elements Q1 and Q2. The power transmission coil 10 and resonance capacitor Cr constitute a "transmission-side resonance circuit."

The switch element Q1 and a parallel connection circuit of an anti-parallel diode Dds1 and a parasitic capacitor Cds1 constitute a switch circuit S1. Similarly, the switch element Q2 and a parallel connection circuit of an anti-parallel diode Dds2 and a parasitic capacitor Cds2 constitute a switch circuit S2. Hereinafter, the anti-parallel diode (parasitic diode) is referred to simply as "diode."

The switching control circuit 1C is connected to the transmission-side resonance circuit. By alternately turning on or off the switch circuits S1 and S2 at a predetermined switching frequency, a direct-current power supply is intermittently applied to the transmission-side resonance circuit, and a resonance current is produced in the transmission-side resonance circuit. In this example, the transmission-side switching circuit forms a half-bridge circuit including the two switch circuits S1 and S2.

The repeating coil 20 and a resonance capacitor Crr constitute a "repeating-side resonance circuit." In FIGS. 1 and 2, the resonance capacitor Crr connected to the repeating coil 20 is not illustrated.

The power reception circuit 3 includes the power reception coil 30, a resonance capacitor Crs, switch elements Q3 and Q4, a reception-side switching circuit including a switching control circuit 3C configured to control the switch elements Q3 and Q4, and a smoothing capacitor Co. The power reception coil 30 and the resonance capacitor Crs, which is equivalently connected in series with it, constitute a "reception-side resonance circuit."

The switch element Q3 and a parallel connection circuit of a diode Dds3 and a capacitor Cds3 constitute a switch circuit S3. Similarly, the switch element Q4 and a parallel connection circuit of a diode Dds4 and a capacitor Cds4 constitute a switch circuit S4.

The switching control circuit 3C detects a current flowing in the power reception coil 30 and alternately turns on or off the switch elements Q3 and Q4 in synchronization with inversion of polarity thereof. This action causes a resonance current flowing in the reception-side resonance circuit to be rectified in synchronization with changes in the direction in which the current flows, and thus the current is provided to the load. These switch circuits S3 and S4 and switching control circuit 3C constitute a reception-side rectifier circuit. The smoothing capacitor Co smoothes a voltage rectified by the reception-side rectifier circuit.

The switching control circuit 1C on the transmission side operates using the input power source Vi as its power source. The switching control circuit 3C on the reception side operates using a voltage occurring in the reception-side resonance circuit, a voltage output to the load, an additional power supply source, or other source as its power source.

The resonance frequency of the above-described transmission-side resonance circuit is equal to or close to the switching frequency of the switching control circuit 1C. The resonance frequency of the transmission-side resonance circuit, the resonance frequency of the repeating-side resonance circuit, and the resonance frequency of the reception-side resonance circuit are equal to or close to each other. Because the transmission-side resonance circuit, repeating-side resonance circuit, and reception-side resonance circuit are coupled to each other and thus multi-resonance occurs, the multi-resonance frequency may be different from the above-described switching frequency. Because the frequency of an alternating magnetic field wirelessly provided (operating frequency of the system) is the switching frequency, the resonance frequency of the repeating-side resonance circuit itself is basically equal to the above-described operating frequency of the system.

The repeating coil 20 and resonance capacitor Crr constitute a resonance circuit. Electromagnetic resonance coupling occurs between the power transmission coil 10 and repeating coil 20. Electromagnetic resonance coupling occurs between the repeating coil 20 and power transmission coil 10. The arrangement in which the repeating coil 20 is positioned between the power transmission coil 10 and power reception coil 30 extends a maximum distance where power can be supplied from the power transmission circuit 1 to the power reception circuit 3. Each of the power transmission coil 10, repeating coil 20, and power reception coil 30 is equivalently represented as a circuit including an ideal transformer, a mutual inductance, and a leakage inductance.

The mutual inductance equivalently formed between the power transmission coil 10 and repeating coil 20 produces magnetic resonance coupling, the mutual inductance equivalently formed between the repeating coil 20 and power reception coil 30 produces magnetic resonance coupling, and power is provided from the power transmission circuit 1 to the power reception circuit 3. Energy that is not supplied from the power transmission circuit 1 and is reflected (reactive power) is saved as resonance energy in the transmission-side resonance circuit. Of the energy received by the power reception circuit 3, energy that is not output and is reflected (reactive power) is also saved as resonance energy in the reception-side resonance circuit.

In an example case where the power transmission circuit 1 wirelessly supplies power of 0.1 to 80 W at 6 to 14 MHz with a distance of 2 to 50 mm, one example radius of the power transmission coil 10 may be in the range between 25 mm and 75 mm and one example line diameter of the conductive line may be on the order of 1 mm to 2 mm. The power transmission coil 10, repeating coil 20, and power reception coil 30 can be made by forming a metal line into a loop shape or by forming a loop-shaped conductive pattern on a circuit substrate.

Figure 4:
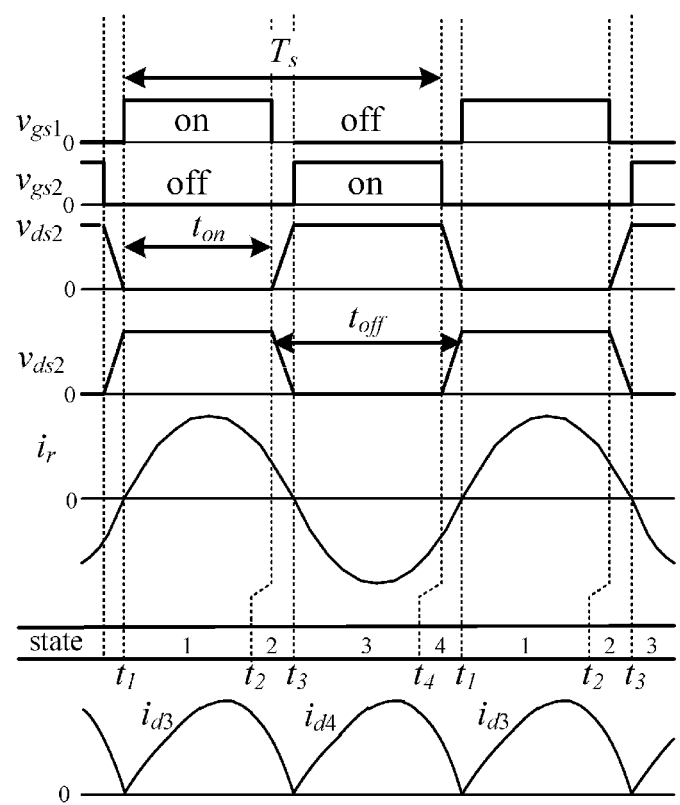
FIG. 4 illustrates waveforms of portions in FIG. 3.

Next, the details of operations of the wireless power supply system 401A illustrated in FIG. 3 are described with reference to FIG. 4. FIG. 4 illustrates waveforms of portions in FIG. 3.

The mutual inductance of the power transmission coil 10 is expressed as Lm, the leakage inductance of the power transmission coil 10 is expressed as Lr, the mutual inductance of the power reception coil 30 is expressed as Lms, and the leakage inductance of the power reception coil 30 is expressed as Lrs. The gate-to-source voltages of the switch element Q1 and switch element Q2 are expressed as vgs1 and vgs2, respectively, and the drain-to-source voltages thereof are expressed as vds1 and vds2, respectively.

The switch elements Q1 and Q2 are alternately turned on or off with short dead time intervals in which both switch elements are in an off state, their respective currents flowing in the switch elements Q1 and Q2 in the dead time intervals are commutated, and ZVS actions are performed. The operations at each state in one switching period are described below.

(1) State 1 Time t1 to t2

First, the diode Dds1 is brought into conduction. In the conduction term of the diode Dds1, the ZVS action is performed by turning on the switch element Q1, and the switch element Q1 is brought into conduction. Equivalent mutual inductances Lm and Lms are formed between the power transmission coil 10 by mutual induction and power reception coil 30. In a multi-resonance circuit composed of Cr, Lr, Lm, Lms, Crs, and Lrs, the transmission resonance circuit and reception resonance circuit are resonated, a resonance current flows in the mutual inductances Lm and Lms, electromagnetic resonance coupling is formed, and power is provided from the transmission circuit to the reception circuit. On the transmission side, the resonance current flows in the capacitor Cr and leakage inductance Lr. On the reception side, the resonance current flows in the capacitor Crs and leakage inductance Lrs, it is rectified by the switch elements Q3 and Q4, and the power is provided to the load.

When the switch element Q1 is turned off, the status enters a state 2.

(2) State 2 Time t2 to t3

On the side of the power transmission circuit 1, a current ir flowing in the leakage inductance Lr causes the parasitic capacitor Cds1 to be charged and the parasitic capacitor Cds2 to be discharged. When a voltage vds1 becomes the voltage of the input voltage Vi and a voltage vds2 becomes 0 V, the diode Dds2 is brought into conduction, and the status enters a state 3.

(3) State 3 Time t3 to t4

First, the diode Dds2 is brought into conduction. In the conduction term of the diode Dds2, the ZVS action is performed by turning on the switch element Q2, and the switch element Q2 is brought into conduction. Equivalent mutual inductances Lm and Lms are formed between the power transmission coil 10 and power reception coil 30 by mutual induction. In the multi-resonance circuit composed of Cr, Lr, Lm, Lms, Crs, and Lrs, the transmission resonance circuit and reception resonance circuit are resonated, the resonance current flows in the mutual inductances Lm and Lms, electromagnetic resonance coupling is formed, and power is provided from the transmission circuit to the reception circuit. On the transmission side, the resonance current flows in the capacitor Cr and leakage inductance Lr. On the reception side, the resonance current flows in the capacitor Crs and leakage inductance Lrs and is rectified by the switch elements Q3 and Q4, and the power is provided to the load.

When the switch element Q2 is turned off, the status enters a state 4.

(4) State 4 Time t4 to t1

On the side of the power transmission circuit 1, the current ir flowing in the leakage inductance Lr causes the parasitic capacitor Cds1 to be discharged and the parasitic capacitor Cds2 to be charged. When the voltage vds1 becomes 0 volt and voltage vds2 becomes the voltage of the input power source Vi, the diode Dds1 is brought into conduction, and the status enters the state 1 again.

After that, the states 1 to 4 are periodically repeated.

Second Embodiment

A second embodiment illustrates an example power transmission device in which a power-transmission-coil near member is positioned outside a casing.

Figure 5:
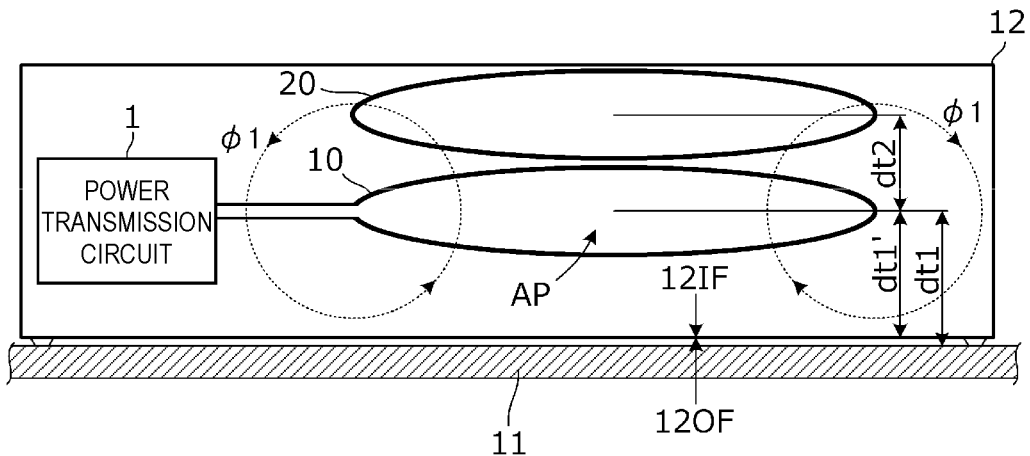
FIG. 5 illustrates a configuration of a power transmission device 102 according to a second embodiment.

FIG. 5 illustrates a configuration of a power transmission device 102 according to the second embodiment. The power transmission device 102 includes the nonmagnetic and insulating casing 12. The casing 12 houses the power transmission circuit 1, power transmission coil 10, and repeating coil 20. The power reception device is placed on the upper portion of the power transmission device 102, as in the case illustrated in FIG. 2.

The power-transmission-coil near member 11 may be a conductive or magnetic member, such as a steel desk. FIG. 5 illustrates a state in which the power transmission device 102 is placed on the power transmission device 102. The casing 12 has an inner surface 12IF opposed to the coil aperture AP of the power transmission coil and an outer surface 12OF positioned on the back side of the inner surface 12IF.

When the shortest distance between the power transmission coil 10 and the outer surface 12OF of the casing 12 is expressed as dt1' and the shortest distance between the power transmission coil 10 and the repeating coil 20 is expressed as dt2, dt2≤dt1'. Inevitably, dt1, which is the shortest distance between the power transmission coil 10 and the power-transmission-coil near member 11, is larger than dt1', and thus dt2≤dt1.

In the above-described configuration, of magnetic flux generated by the power transmission coil 10, magnetic flux that does not reach the power-transmission-coil near member 11 links with the repeating coil 20. Accordingly, the effect of the power-transmission-coil near member 11 is small, and power can be supplied from the power transmission coil 10 to the power reception coil via the repeating coil 20.

Third Embodiment

A third embodiment illustrates an example wireless power supply system including a plurality of repeating coils.

Figure 6:
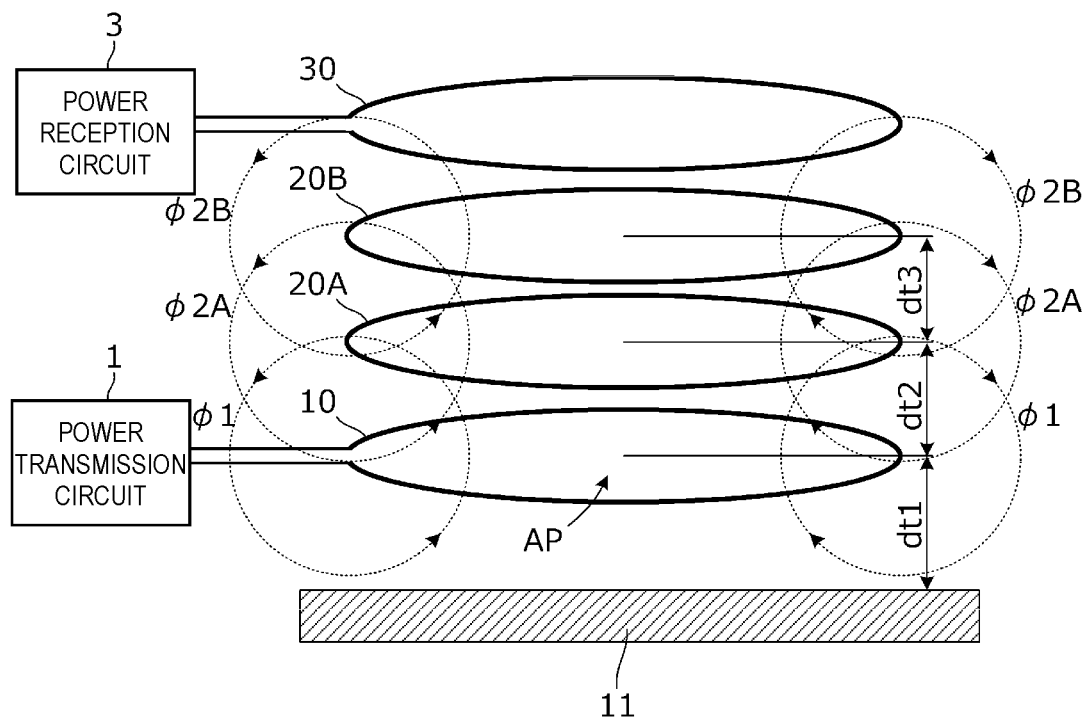
FIG. 6 illustrates a configuration of a wireless power supply system 403 according to a third embodiment.

FIG. 6 illustrates a configuration of a wireless power supply system 403 according to the third embodiment. The wireless power supply system 403 is a wireless power supply system in which high-frequency power is wirelessly provided from the power transmission device including the power transmission coil 10 to the power reception device including the power reception coil 30.

As illustrated in FIG. 6, the wireless power supply system 403 includes the power transmission coil 10, repeating coils 20A and 20B, and the power reception coil 30, each of which has a circular loop shape. The repeating coils 20A and 20B are disposed between the power transmission coil 10 and power reception coil 30. The coil apertures of the power transmission coil 10, repeating coils 20A and 20B, and power reception coil 30 are opposed to each other. That is, the winding axes of the power transmission coil 10, repeating coils 20A and 20B, and power reception coil 30 coincide with or are parallel with each other.

The power transmission coil 10 is connected to the power transmission circuit 1. The power reception coil 30 is connected to the power reception circuit 3. The power transmission coil 10 and repeating coil 20A are at least magnetic-field coupled to each other. The repeating coil 20A and repeating coil 20B are at least magnetic-field coupled to each other. The repeating coil 20B and power reception coil 30 are at least magnetic-field coupled to each other. Accordingly, the power transmission coil 10 and power reception coil 30 are at least magnetic-field coupled to each other via the repeating coils 20A and 20B.

The power transmission coil 10 has the coil aperture AP. The coil aperture AP of the power transmission coil 10 is opposed to the power-transmission-coil near member 11. The power-transmission-coil near member 11 is a conductive or magnetic member. Examples of the power-transmission-coil near member 11 may include an iron plate, a stainless steel plate, and an aluminum plate. The repeating coils 20A and 20B are arranged on the side opposite to the side on which the power-transmission-coil near member 11 is arranged with respect to the power transmission coil 10.

When the shortest distance between the power transmission coil 10 and power-transmission-coil near member 11 is expressed as dt1, the shortest distance between the power transmission coil 10 and repeating coil 20A is expressed as dt2, and the shortest distance between the repeating coils 20A and 20B is expressed as dt3, dt2≤dt1 and dt3≤dt2.

In FIG. 6, magnetic flux φ1 represents a path of magnetic flux generated by the power transmission coil 10, magnetic flux φ2A represents a path of magnetic flux generated by the repeating coil 20A, and magnetic flux φ2B represents a path of magnetic flux generated by the repeating coil 20B.

The positional relation of the power-transmission-coil near member 11, power transmission coil 10, and the repeating coil 20A, which is near the power transmission coil 10, is dt2≤dt1, as in the relations illustrated in the first and second embodiments. Accordingly, the effect of the power-transmission-coil near member 11 is small, and the repeating coil 20A is coupled to the power transmission coil 10.

When the shortest distance dt3 between the repeating coils 20A and 20B is equal to the shortest distance dt2 between the repeating coil 20A and power transmission coil 10, the coefficient of coupling between the power transmission coil 10 and repeating coil 20A and the coefficient of coupling between the repeating coils 20A and 20B are equal to each other. Thus, the power transmission coil 10 and the second repeating coil 20B can be efficiently distant from each other, and large efficiency of supplying energy per distance can be ensured. It is noted, however, that because a conductor loss occurs in each coil, there is a tendency to ensure higher efficiency of supplying energy per distance when the gap between the coils is narrower as the coils are more remote from the power transmission coil. Thus, as described above, dt3≤dt2 may be preferred rather than dt3=dt2.

The example illustrated in FIG. 6 includes the two repeating coils 20A and 20B. The configuration is also applicable to examples that include three or more repeating coils. Generally described, where the ordinal number is expressed as n-th (n is integer greater than or equal to one), a case where an n-th repeating coil and an (n+1)-th repeating coil positioned farther from the power transmission coil 10 than the n-th repeating coil are included is discussed. In that case, when the distance from the n-th repeating coil to the (n+1)-th repeating coil is expressed as dt(n+2) and the distance from an (n−1)-th repeating coil positioned nearer the power transmission coil than the n-th repeating coil to the n-th repeating coil or the distance from the power transmission coil to the n-th repeating coil is expressed as dt(n+1), dt(n+2)≤dt(n+1) may be preferred.

Fourth Embodiment

A fourth embodiment illustrates a wireless power supply system including a power-reception-coil near member.

Figure 7:
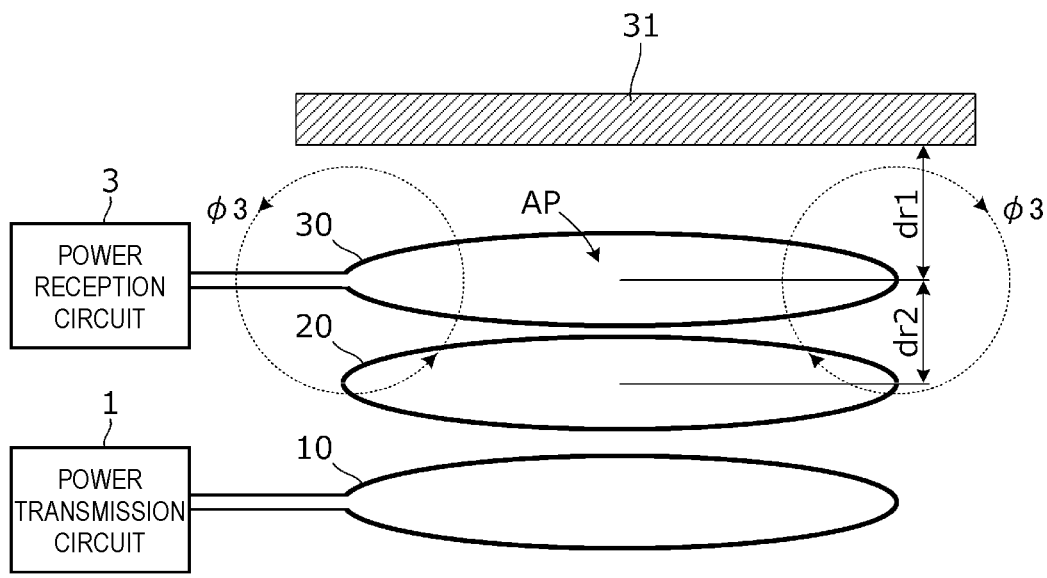
FIG. 7 illustrates a configuration of a wireless power supply system 404 according to a fourth embodiment.

FIG. 7 illustrates a configuration of a wireless power supply system 404 according to the fourth embodiment. As illustrated in FIG. 7, the wireless power supply system 404 includes the power transmission coil 10, repeating coil 20, and power reception coil 30, each of which has a circular loop shape. The repeating coil 20 is disposed between the power transmission coil 10 and power reception coil 30. The coil apertures of the power transmission coil 10, repeating coil 20, and power reception coil 30 are opposed to each other. That is, the winding axes of the power transmission coil 10, repeating coil 20, and power reception coil 30 coincide with or are parallel with each other.

The power reception coil 30 has a coil aperture AP. The coil aperture AP of the power reception coil 30 is opposed to a power-reception-coil near member 31. The power-reception-coil near member 31 is a conductive or magnetic member. Examples of the power-reception-coil near member 31 may include an iron plate, a stainless steel plate, and an aluminum plate. The repeating coil 20 is arranged on the side opposite to the side on which the power-reception-coil near member 31 is arranged with respect to the power reception coil 30.

When the shortest distance between the power reception coil 30 and power-reception-coil near member 31 is expressed as dr1 and the shortest distance between the power reception coil 30 and repeating coil 20 is expressed as dr2, dr2≤dr1. Magnetic flux 43 represents a path of magnetic flux linking with the power reception coil 30.

In the above-described configuration, of the magnetic flux linking with the power reception coil 30, magnetic flux that does not reach the power-reception-coil near member 31 links with the repeating coil 20. Accordingly, the effect of the power-reception-coil near member 31 is small, and the power reception coil 30 can receive power via the repeating coil 20.

Fifth Embodiment

A fifth embodiment illustrates a wireless power supply system including the power-transmission-coil near member and power-reception-coil near member.

Figure 8:
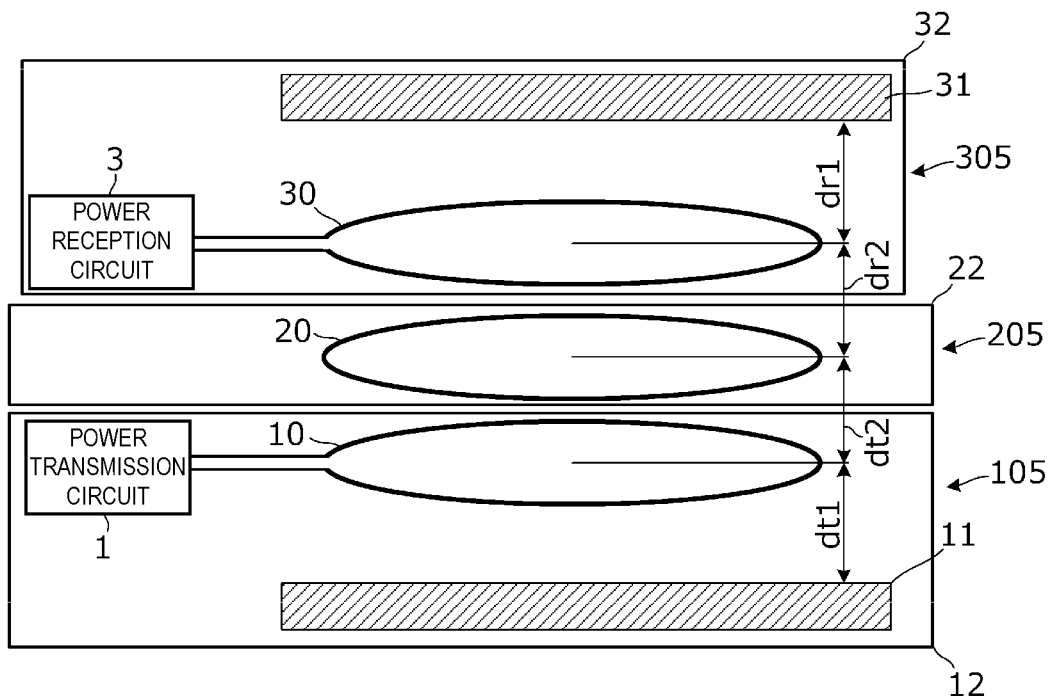
FIG. 8 illustrates a configuration of a wireless power supply system 405 according to a fifth embodiment.

FIG. 8 illustrates a configuration of a wireless power supply system 405 according to the fifth embodiment. In this example, the wireless power supply system 405 includes a repeating device 205 that includes the repeating coil 20 and that is disposed separately from a power transmission device 105 and power reception device 305. The repeating device 205 includes a nonmagnetic and insulating casing 22 in which the repeating coil 20 and a resonance capacitor (not illustrated) are housed. FIG. 8 illustrates a state in which the repeating device 205 is placed on a placement surface of the power transmission device 105 and the power reception device 305 is placed on a placement surface of the repeating device 205.

When the shortest distance between the power transmission coil 10 and power-transmission-coil near member 11 is expressed as dt1 and the shortest distance between the power transmission coil 10 and repeating coil 20 is expressed as dt2, dt2≤dt1. When the shortest distance between the power reception coil 30 and power-reception-coil near member 31 is expressed as dr1 and the shortest distance between the power reception coil 30 and repeating coil 20 is expressed as dr2, dr2≤dr1.

In the above-described configuration, of the magnetic flux generated by the power transmission coil 10, magnetic flux that does not reach the power-transmission-coil near member 11 links with the repeating coil 20, and the effect of the power-transmission-coil near member 11 is small. Of the magnetic flux linking with the power reception coil 30, magnetic flux that does not reach the power-reception-coil near member 31 links with the repeating coil 20, and the effect of the power-reception-coil near member 31 is small. Accordingly, the effects of the power-transmission-coil near member 11 and power-reception-coil near member 31 are small, and power can be supplied from the power transmission coil 10 to the power reception coil 30 via the repeating coil 20.

The above-described embodiments illustrate the examples in which the power transmission coil 10, repeating coils 20, 20A, and 20B, and power reception coil 30 have the same diameter and their winding axes coincide with or are parallel with each other. The power transmission coil 10, repeating coils 20, 20A, and 20B, and power reception coil 30 may be in other relationships. The present disclosure is also applicable to cases where neighboring coils are not parallel with each other, where they have different diameters, where their winding axes do not coincide with each other, and furthermore, where their winding axes are in the relationship of "skew lines."

The coil opening of each of the power transmission coil 10, repeating coils 20, 20A, and 20B, and power reception coil 30 is not limited to a planar shape and may form a curve plane. For example, sheet coils in which coil conductive patterns are formed on flexible bases may be arranged along a curved plane.

The power-transmission-coil near member is not limited to a planar shape and may have a curved shape, a shape that is planar in part, or a shape that is curved in part. For example, the surface of the power-transmission-coil near member 11 opposed to the coil aperture of the power transmission coil 10 may have a cylindrical side shape. Similarly, the surface of the power-reception-coil near member 31 opposed to the coil aperture of the power reception coil 30 may have a cylindrical side shape.

For all of the above-described sizes and shapes of the power-transmission-coil near member, power transmission coil, repeating coils, power reception coil, and power-reception-coil near member, when two members defining a distance are in infinitesimal sections, the shortest distance among distances between the infinitesimal sections is defined as the above-described "shortest distance," and substantially the same operational advantages are obtainable by satisfying the above-described conditions for that "shortest distance."

Lastly, the description about the above embodiments is illustrative in all respects and is not restrictive. Modifications and changes may be made by those skilled in the art. The scope of the present disclosure is indicated by the claims, not the above-described embodiments. The scope of the present disclosure embraces changes from the embodiments within a scope equivalent to the scope of the claims.

What is claimed is:

1. A power transmission device in a wireless power supply system in which high-frequency power is wirelessly provided from the power transmission device to a power reception device, the power transmission device including a power transmission coil, the power reception device including a power reception coil at least magnetically coupled to the power transmission coil, and the power transmission coil having a coil aperture, the power transmission device comprising:
   a power transmission circuit connected to the power transmission coil;
   a conductive or magnetic power-transmission-coil near member opposed to the coil aperture of the power transmission coil and having a planar or curved surface portion, an eddy current caused by a magnetic field based on an operation of the wireless power supply system being allowed to flow in the power-transmission-coil near member, the power-transmission-coil near member being a shield plate that is disposed on a lower surface of a nonmagnetic and insulating casing of the power transmission device; and
   a repeating coil arranged on a side opposite to a side on which the power-transmission-coil near member is arranged with respect to the power transmission coil and coupled to the power transmission coil at least via a magnetic field,
   wherein when a shortest distance between the power transmission coil and the power-transmission-coil near member is expressed as dt1 and a shortest distance between the power transmission coil and the repeating coil is expressed as dt2, dt2≤dt1, and
   dt2≤dt1 causes an increase in power loss of the power transmission device to be suppressed and causes a decrease in power efficiency of the power transmission device to be suppressed.

2. A power transmission device in a wireless power supply system in which high-frequency power is wirelessly provided from the power transmission device to a power reception device, the power transmission device including a power transmission coil, the power reception device including a power reception coil at least magnetically coupled to the power transmission coil, and the power transmission coil having a coil aperture, the power transmission device comprising:
   a power transmission circuit connected to the power transmission coil;
   a casing housing the power transmission coil, the casing including a nonmagnetic and insulating material, and the casing having an inner surface opposed to the coil aperture of the power transmission coil, an outer surface on a back side of the inner surface, and a shield plate that is disposed on a lower surface of the casing; and
   a repeating coil arranged on a side opposite to the inner surface of the casing with respect to the power transmission coil and coupled to the power transmission coil at least via a magnetic field,
   wherein when a shortest distance between the power transmission coil and the shield plate is expressed as dt1' and a shortest distance between the power transmission coil and the repeating coil is expressed as dt2, dt2≤dt1', and
   dt2≤dt1' causes an increase in power loss of the power transmission device to be suppressed and causes a decrease in power efficiency of the power transmission device to be suppressed.

3. The power transmission device according to claim 1, further comprising a resonance capacitor connected to the repeating coil and constituting a resonance circuit together with the repeating coil.

4. The power transmission device according to claim 3, wherein a resonance frequency of the resonance circuit is equal to a frequency of an alternating magnetic field formed from the power transmission coil.

5. The power transmission device according to claim 2, further comprising a resonance capacitor connected to the repeating coil and constituting a resonance circuit together with the repeating coil.

6. A wireless power supply system in which high-frequency power is wirelessly provided from a power transmission device to a power reception device, the power transmission device including a power transmission coil, the power reception device including a power reception coil at least magnetically coupled to the power transmission coil,
   the power transmission coil having a coil aperture, and
   the power transmission device including a power transmission circuit connected to the power transmission coil, a conductive or magnetic power-transmission-coil near member opposed to the coil aperture of the power transmission coil and having a planar or curved surface portion, an eddy current caused by a magnetic field based on an operation of the wireless power supply system being allowed to flow in the power-transmission-coil near member, and a repeating coil arranged on a side opposite to a side on which the power-transmission-coil near member is arranged with respect to the power transmission coil and coupled to the power transmission coil at least via a magnetic field, the power-transmission-coil near member being a shield plate that is disposed on a lower surface of a nonmagnetic and insulating casing of the power transmission device, wherein when a shortest distance between the power transmission coil and the power transmission-coil near member is expressed as dt1 and a shortest distance between the power transmission coil and the repeating coil is expressed as dt2, dt2≤dt1, and dt2≤dt1 causes an increase in power loss of the power transmission device to be suppressed and causes a decrease in power efficiency of the power transmission device to be suppressed.

7. The wireless power supply system according to claim 6, wherein, where an ordinal number is expressed as n-th (n is an integer greater than or equal to one), when the repeating coil includes an n-th repeating coil and an (n+1)-th repeating coil positioned farther from the power transmission coil than the n-th repeating coil, and a distance from the n-th repeating coil to the (n+1)-th repeating coil is expressed as dt(n+2) and a distance from an (n−1)-th repeating coil positioned nearer the power transmission coil than the n-th repeating coil to the n-th repeating coil or a distance from the power transmission coil to the n-th repeating coil is expressed as dt(n+1), dt(n+2)≤dt(n+1).

8. The wireless power supply system according to claim 6, further comprising a resonance capacitor connected to the repeating coil and constituting a resonance circuit together with the repeating coil.

9. The wireless power supply system according to claim 8, wherein a resonance frequency of the resonance circuit is equal to a frequency of an alternating magnetic field formed from the power transmission coil.

* * * * *